United States Patent
Najmolhoda et al.

(10) Patent No.: US 6,435,472 B1
(45) Date of Patent: *Aug. 20, 2002

(54) PROPORTIONAL VARIABLE FORCE SOLENOID CONTROL VALVE WITH ARMATURE DAMPING

(75) Inventors: Hamid Najmolhoda, Grand Rapids; David L. Seid, North Muskegon; David A. Nezwek, Marne; John A. Cruden, Jr., Cedar Springs, all of MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/843,341

(22) Filed: Apr. 25, 2001

Related U.S. Application Data

(62) Division of application No. 09/430,987, filed on Nov. 1, 1999, now Pat. No. 6,223,761, which is a division of application No. 08/978,257, filed on Nov. 26, 1997, now Pat. No. 5,984,259.

(51) Int. Cl.[7] .............................................. F16K 31/06
(52) U.S. Cl. ................ 251/50; 137/625.64; 251/129.08; 251/129.14; 251/129.17
(58) Field of Search ................. 137/625.64; 251/50, 251/129.08, 129.14, 129.17

(56) References Cited

U.S. PATENT DOCUMENTS

| | | |
|---|---|---|
| 3,103,612 A | 9/1963 | Marmo |
| 3,211,417 A | 10/1965 | Ray |
| 3,226,605 A | 12/1965 | Wright et al. |
| 3,441,246 A | 4/1969 | Lauppe et al. ................. 251/52 |
| 4,114,125 A | 9/1978 | Komatsu |
| 4,316,599 A * | 2/1982 | Bouvet et al. ............. 251/50 X |
| 4,669,504 A * | 6/1987 | Fujitsugu et al. .......... 251/50 X |
| 4,794,890 A | 1/1989 | Richeson |
| 4,947,887 A | 8/1990 | Fox |
| 4,988,074 A | 1/1991 | Najomolhoda |
| 5,060,695 A | 10/1991 | McCabe |
| 5,139,224 A | 8/1992 | Bright |
| 5,165,652 A | 11/1992 | Nicolaisen |
| 5,188,073 A | 2/1993 | Ejira et al. |
| 5,240,227 A * | 8/1993 | Sich ................... 251/129.17 X |
| 5,487,410 A | 1/1996 | Neithammer |
| 5,547,165 A * | 8/1996 | Brehm et al. .............. 251/50 X |
| 5,611,370 A * | 3/1997 | Najmolhoda ........ 251/129.14 X |
| 5,845,667 A * | 12/1998 | Najmolhoda et al. ...... 137/82 X |
| 5,984,259 A * | 11/1999 | Najmolhoda et al. .......... 251/50 |
| 5,996,628 A * | 12/1999 | Najmolhoda et al. ... 251/129.14 X |

FOREIGN PATENT DOCUMENTS

| | | | |
|---|---|---|---|
| DE | 1450547 | 12/1968 | |
| DE | 31 44 362 | * 5/1983 | ............. 137/625.65 |
| DE | 3310021 | 9/1984 | |
| DE | 3529134 | 2/1987 | |

* cited by examiner

*Primary Examiner*—Gerald A. Michalsky

(57) ABSTRACT

Proportional variable force solenoid valve for controlling the pressure of a fluid in a fluid control system comprises a solenoid housing having therein a solenoid coil, an armature movable in response to electrical current applied to the solenoid coil, and a biasing spring for biasing the armature in a direction to establish a valve fluid pressure response to solenoid coil current. An inner armature end cooperates with or engages a damping member residing in a fluid damping chamber to reduce non-linear valve responses resulting from pressure oscillations in the fluid control system.

7 Claims, 3 Drawing Sheets

PROPORTIONAL VARIABLE FORCE SOLENOID CONTROL VALVE WITH ARMATURE DAMPING

This is a division of Ser. No. 09/430 987 filed Nov. 1, 1999, now U.S. Pat. No. 6,223,761, which is a division of Ser. No. 08/978,257 filed on Nov. 26, 1997, now U.S. Pat. No. 5,984,259.

FIELD OF THE INVENTION

The present invention relates to a proportional variable force solenoid operated valve that controls fluid pressure in response to electrical current applied to a valve solenoid and, more particularly, to a proportional variable force solenoid operated valve having armature damping means to improve valve response stability to pressure oscillations in the controlled fluid system.

BACKGROUND OF THE INVENTION

A proportional variable force solenoid control valve that is relative low in cost to manufacture and compact in size while maintaining substantially linear proportional fluid control is described in the Najmolhoda U.S. Pat. No. 4,988,074 issued Jan. 29, 1991, of common assignee herewith. The patented proportional varaible force solenoid control valve comprises an outer steel solenoid housing and an aluminum valve member housing joined together mechanically such as by tabs on the steel solenoid housing being crimped about regions of the aluminum valve member housing.

The proportional variable force control valve includes a ferromagnetic (e.g. steel) armature suspended by low spring rate springs at opposite ends of the armature within the bore hole of a coreless solenoid bobbin for reciprocable movement between positions corresponding to a closed valve position and fully open valve position in response to applied electrical current to an electromagetic coil. The position of the armature is controlled by balancing the variable force of an electromagnetic field of an electromagnetic coil and the force of the magnetic field of a permanent ring magnet against the force of a compression coil spring which biases the valve toward the closed position of the valve. The electromagnetic coil, bobbin and armature reside in the steel solenoid housing in a manner that the steel housing provides a concentration of flux of the electromagnetic field at the armature. The fluid control valve on the end of the armature moves relative to a valve seat disposed in the aluminum valve housing to communicate a fluid inlet to fluid exhaust ports so as to regulate fluid pressure at fluid control ports in a manner proportional to the magnitude of applied electrical current.

A commercially manufactured version of the aforementioned patented proportional variable force solenoid fluid control valve has been modified to include a stainless steel ball valve and a separate stainless steel valve seat insert pressed in the nozzle. The ball valve is captured in a stainless steel cage between the valve seat and a rod-like, cylindrical shaped steel armature that moves relative to the valve seat in a manner proportional to the magnitude of electrical current applied to the electromagnetic coil. As the armature moves relative to the valve seat to actuate the valve, the ball valve is caused to follow the end of the armature by virtue of fluid pressure in the valve member housing and confinement in the ball valve cage in the bobbin. The fluid inlet is communicated to fluid exhaust ports by opening of the ball valve so as to regulate fluid pressure at fluid control ports in a manner proportional to the magnitude of electrical current applied to the coil.

A spool valve is disposed in the valve member housing for providing a two stage, high flow capability wherein pressurized fluid supplied to the inlet port initially is directed to bypass the control ports and flows to an end of the spool valve to move it from a zero fluid flow spool position to a maximum fluid flow spool position relative to the control ports as determined by the cracking pressure preset for the ball valve by adjustment of the coil spring force. Thereafter, a second stage of operation involves controlling the fluid flow through the control ports by moving the spool valve between minimum and maximum flow spool positions in a manner proportional to the magnitude of electrical current to the coil. Such proportional variable force solenoid control valves commercially manufactured to-date are operably mounted to a cast aluminum transmission body or case by a clamp plate, bolt, or both engaging an outer nozzle groove. The Najmolhoda U.S. Pat. No. 5,611,370 issued Mar. 18, 1997, also describes a proportional variable force solenoid control valve that includes a substantially non-magnetic common housing for the solenoid and control valve, simplfying valve manufacture and construction while maintaining substantially linear proportional fluid pressure control.

In use of the proportional variable force solenoid pressure control valve in an electronically controlled automatic transmission of an automobile or other complex hydraulic control system, there are many sources of hydraulic and/or electro-mechanical "noise" in the controlled fluid system, which can initiate or aggravate system instability by causing a sympathetic harmonic vibration in related system components. System hydraulic vibrational instabilities can create detrimental valve performance characteristics which affect vehicle performance or reliability. In an automatic transmission, the proportional variable force solenoid pressure control valve usually controls many critical system parameters and its performance should be consistent and stable. When a pressure control solenoid responds to the inherent electronic and/or hydraulic system noise by being forced into an uncontrolled vibration response, the entire fluid system may become unstable.

An object of the present invention is to provide a proportional variable force solenoid fluid control valve and method having improved valve response stability to noise in the controlled fluid system, especially in use in an electronically controlled hydraulic automatic transmission application.

Another object of the present invention is to provide a proportional variable force solenoid control valve and method having improved valve response stability to noise in the controlled fluid system by virtue of armature damping means.

SUMMARY OF THE INVENTION

The present invention provides a proportional variable force solenoid fluid control valve and method for controlling the pressure of a pressurized fluid in a fluid control system in proportion to the current level of an electrical input signal. In one embodiment of the present invention, the proportional variable force solenoid fluid control valve comprises an armature in engagement with a fluid pressure control valve and movable in response to electrical current applied to a solenoid disposed on a coil bobbin in a solenoid housing and means for biasing the armature in a direction to establish a valve fluid pressure response to current level supplied to the solenoid (i.e. fluid pressure versus solenoid current).

In accordance with an embodiment of the present invention, the armature includes or cooperates with a damping member, such as an armature damping disk connected to or engaged by an inner end of the armature, for movement therewith in a fluid damping chamber disposed proximate the inner armature end to receive the damping member in a manner to reduce or dampen pressure oscillations resulting from electrical, mechanical and/or hydraulic noise in the controlled fluid system or circuit, thereby improving valve response stability. The cross-sectional area of the damping member and clearance between the periphery of the damping member and the cooperating wall of the damping chamber are selected to this end. The damping member may be formed integral with the armature or connected thereto, such as by press-fit. Alternately, the damping member may be separate from the armature yet engaged thereby in a manner to reduce or dampen pressure oscillations.

In one embodiment of the invention, the damping chamber is disposed in a valve or nozzle housing proximate fluid exhaust ports, although the invention is not limited in this regard.

The damping member may be made of a magnetically permeable material, such as steel, to provide an improved magnetic flux carrier to direct magnetic flux directly into the armature, while reducing size of the solenoid unit, although the invention is not limited in this regard.

The foregoing and other objects, features, and advantages of the invention wll become apparent from the following more detailed description taken with the accompanying following drawings.

DESCRIPTION OF THE INVENTION

Figure 1:
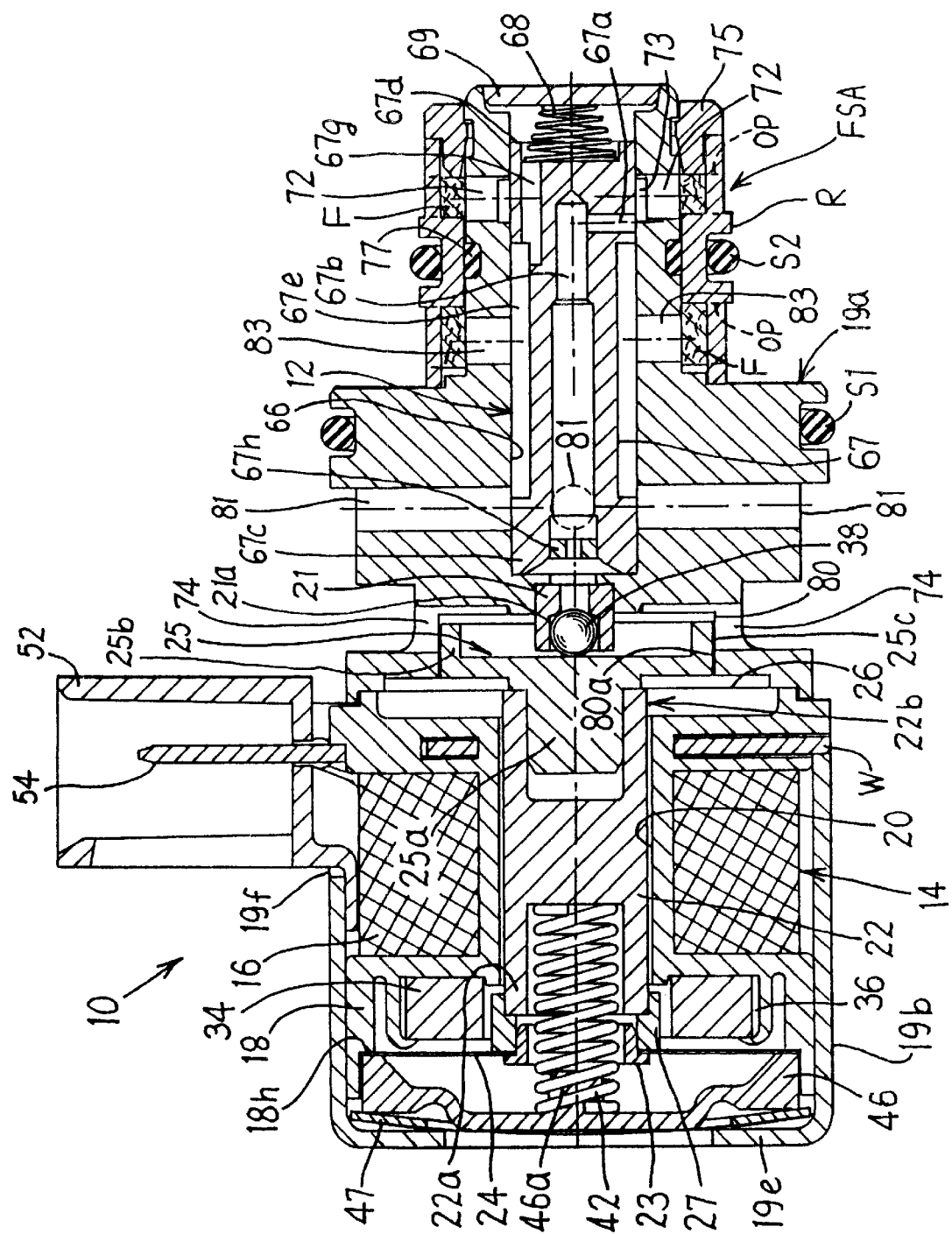
FIGS. 1–3 are longitudinal cross section views of different embodiments of a proportional variable force solenoid fluid control valve in accordance with embodiments of the present invention.

Referring to FIG. 1, a proportional variable force solenoid fluid control valve 10 includes valve member 12 and associated valve components disposed in a valve or nozzle housing 19a and a solenoid 14 disposed in a generally cylindrical solenoid housing 19b in a manner to provide a fluid control valve of the general type described in the Najmolhoda U.S. Pat. No. 4,988,074 of common assignee herewith, the teachings of which are incorporated herein by reference. The valve housing 19a can be made of aluminum, while the solenoid housing 19b can comprise steel or other ferromagnetic material pursuant to U.S. Pat. No. 4,988,074. The valve housing 19a and solenoid housing 19b can be joined together by tabs (not shown) of the solenoid housing 19b crimped over an annular shoulder of the valve housing 19a as shown in U.S. Pat. No. 4,988,074, or formed as a single, common housing, pursuant to Najmolhoda U.S. Pat. No. 5,611,370 with the common housing made of a substantially nonmagnetic material with little or no magnetic permeability, the teachings of which patents are incorporated herein by reference to this end.

A material particularly suited for such a common or single housing comprises aluminum and its alloys or thermoplastic formed by casting or injection molding to required housing configuration to receive the valve member 12 and the solenoid 14. The common housing will include a housing section or region for enclosing the solenoid 14 and a nozzle housing section or region for enclosing the valve 12 and associated valve components. Referring to FIG. 1, the solenoid 14 is disposed in the solenoid housing 19b (or solenoid housing section of the common housing embodiment) and includes an electromagnetic solenoid coil 16 wound about a cylindrical surface of molded plastic bobbin 18 which has a cylindrically shaped bore hole 20 through the longitudinal axis thereof. The bobbin 18 is made of glass filled thermoplastic. An axially elongated, generallly cylindrical armature 22 formed of a ferromagnetic material (e.g. steel) is suspended within the bore hole 20 of the plastic bobbin 18 by a thin low spring rate spring 24 mounted at a rear, outermost end 22a of the armature.

The plate spring 24 is of the type described in the aforementioned Najmolhoda U.S. Pat. No. 4,988,074, the teachings of which are incorporated herein by reference. That is, the spring plate is formed from very thin nonmagnetic austenitic stainless steel, such as full hard austenitic stainless steel, which provides a very low rate spring for the spring configuration shown in FIG. 5 of the aforementioned '074 patent. The inner periphery of the plate spring 24 is mounted by half hard brass plate annular retainer member 23 and half hard brass annular retainer 27 mounted to the rear, outer end 22a of the armature 22 so as to suspend the armature 22 for free axial longitudinal movement within the bobbin 18. The opposite front, inner end 22b of the armature is supported by a similar optional plate spring 26. The plate spring 26 may be omitted from the embodiment of FIG. 1 with the inner end 22b of the armature 22 unsupported, except by the axial periphery of damping member 25 received in damping chamber 80 as described below.

The outer periphery of the plate spring 24 is mounted between the radially enlarged annular end flange 18h of the coil bobbin 18 and an opposing annular end of valve housing cap or closure 46 made of aluminum alloy (e.g. Al alloy 6061 T6). The solenoid housing 19a includes an annular end flange 19e overlying the cap or closure 46 as shown with a Bellvelle wave washer 47 therebetween to accommodate stack up tolerances.

As shown in FIG. 1, an inner end 22b of the armature 22 cooperates with a fluid damping member 25 that, in turn, engages a steel ball valve 38. Ball valve 38 cooperates with annular valve seat 21a on a ball valve cage insert 21 pressed in the valve or nozzle housing 19a. The ball valve 38 and valve seat 21a define a fluid diverting valve for diverting fluid to exhaust ports 74 in a manner described below. The cylindrical axial shaft section 25a of damping member 25 is pressed into a cylindrical counterbore in the inner end 22b of the armature 22 as shown so as to be coaxial with the armature 22 and to fix the damping member thereon. An optional carbon steel flux washer W can be provided in a recess in bobbin 18 pursuant to aforementioned U.S. Pat. No. 4,988,074, incorporated herein by reference, to concentrate electromagnetic flux at the inner end of the armature.

An axially magnetized ring magnet 34 is disposed in an annular recess 36 at the rear end of the bobbin 18 axially rearward of the solenoid coil 16. Ring magnet 34 is formed of rare earth permanent magnet material, such as Sm—Co or $Nd_2Fe_{14}B$, permitting use of a reduced size magnet that results in a compact solenoid. Ring magnet 34 produces a permanent magnetic field that substantially saturates the armature 22 even in the absence of electrical current to the coil 16. Thus, a relatively smaller magnetic field is required to move the armature 22 between the axial position shown in FIG. 1 corresponding to a valve closed position (where ball valve 38 is seated on the valve seat 21a) and an axial position to the left in FIG. 1 corresponding to a valve open position (where ball valve 38 is unseated from the valve seat 21a).

The ball valve 38 is received and confined laterally in a flat-sided recess or cage machined or otherwise formed in the stainless steel insert 21 as shown between the inner end of the armature 22 and the valve seat 21a. In this valve arrangement, the ball valve 38 is biased by coil spring 42 against the armature end 22b and follows movement of the armature 22 in a direction toward or away from the valve seat 21a by virtue of the fluid pressure on the ball valve and by virtue being captured in the insert 21.

Coil compression spring 42 (spring biasing means) is trapped in a cylindrical armature counterbore between the axial armature end 22a and a central axially extending projection 46a of the valve housing cap or closure 46. The projection 46a receives the coil spring 42 with the end of the spring 42 engaging the inner surface or wall of the cap 46. The armature 22 is biased to the valve closed position by the coil spring 42 when the solenoid coil 16 is deenergized. The cap or closure 46 includes a cylindrical outer surface received in a cyindrical counterbore of the bobbin 18 to trap spring 24 as shown.

A plastic connector body 52 is mounted on the bobbin 18 and exits the solenoid housing 19b via a suitable opening 19f therein. Electrical contacts 54 (only one shown) extend through the bobbin 18 and through apertures in the connector body 52. Such electrical contacts 54 are shown in the aforementioned Najmolhoda U.S. Pat. No. 4,988,074. The ends of the electrical contacts 54 are connected to the wires of the electromagnetic coil 16 for receiving an electrical current signal from a variable current source (not shown).

In accordance with one embodiment of the invention, the armature damping member 25 includes a generally disk shaped section 25b disposed on shaft section 25a that is received in the inner armature end 22b. The disk section 25b has a cylindrical recess or cavity to form a cup-shaped disk end on the ball valve side thereof to reduce mass and extends radially from the longitudinal axis of the armature 22 and shaft section 25a. The armature damping member can comprise a ferromagnetic material, such as steel, to provide an improved magnetic flux carrier to direct the magnetic flux directly into the armature end 22b, while reducing size of the solenoid unit. The armature damping member 25 alternatively may comprise a plastic material, such as glass filled thermoplastic, or other non-magnetically permeable material, since the present invention is not limited to any particular damping material.

The cup-shaped disk end or section 25b includes a cylindrical outer peripheral surface 25c that cooperates with cylindrical damping chamber 80 disposed in the valve or nozzle housing 19a to reduce or dampen pressure oscillations resulting from electrical, mechanical, and/or hydraulic noise in the controlled fluid system or circuit; i.e. the fluid system or circuit, such as an automatic transmission circuit, controlled by valve 12. To this end, there is a controlled clearance between the outer cylindrical, peripheral surface 25c of the damping member 25 and the cylindrical chamber wall 80a. The damping chamber 80 is machined or otherwise formed in the valve or nozzle housing 19a and communicates with the exhaust ports 74 (two shown with two additional exhaust ports not shown extending into and out of the plane of the drawing).

In operation in an automatic transmission application where the control valve is fully immersed in hydraulic transmission fluid, the damping chamber 80 typically will have predominantly hydraulic fluid therein, although some air may be present in the damping chamber 80.

In accordance with an embodiment of the invention, the cross-sectional area of the damping member 25 and the clearance between the surface 25c and the cooperating wall 80a of the damping chamber 80 are selected effective to reduce or damp pressure oscillations resulting from noise in the controlled fluid system or circuit, which pressure oscillations can result in non-linear valve response performance. An exemplary cross-sectional area of the disk section 25b (cross-sectional area calculated using the outer diameter of damping member 25) can be 0.039 inch$^2$ (0.54 inch outer diameter of damping member disk section). For this exemplary cross-sectional area of the dampng member 25, an exemplary radial clearance of approximately 0.005 inch can be provided between the disk surface 25c and the chamber wall 80a for the proportional variable force solenoid fluid control valve shown in FIG. 1 adapted for use in a hydraulic automatic transmission application for controlling a gear shifting hydraulic circuit. More generally, the aforementioned radial clearance can be in the range of 0.004 to 0.0055 inch for a disc section outer diameter in the range of 0.540 to 0.542 inch and axial length of surface 25c in the range of 0.070 to 0.074 inch in a damping chamber having inner diameter of 0.550 to 0.551 inch to provide a damping area in the range of 0.0003 to 0.0004 inch$^2$, although the invention is not limited in this regard. In effect, the damping chamber 80 and the damping member 25 provide a trapped volume of fluid comprising predominantly hydraulic fluid which must be moved through the restricted clearance area between the surface 25c and the wall 80a and in doing so reduces or damps pressure oscillations resulting from electrical, mechanical, and/or hydraulic noise in the controlled fluid system or circuit.

The valve or nozzle housing 19a includes a longitudinal passageway 66 having a generally cylindrical configuration for receiving an aluminum alloy spool 67 (e.g. Al alloy 6262) which is received in the passageway 66 in a close fit, sliding manner at spool end regions for axial reciprocable movement.

The housing 19a is disposed in a bore or chamber (not shown) in a cast aluminum transmission body (not shown) or other fluid control system. Outer O-ring seals S1, S2 on the valve housing 19a seal on the transmission housing and separate the supply and control lines or conduits (not shown) of the transmission hydraulic circuit.

The valve housing 19a includes a pressurized fluid supply or inlet port 72, a plurality of control ports 83, a plurality of first exhaust ports 81 associated with the control ports 83, and a plurality of second exhaust ports 74 associated with the ball valve 38. The valve housing 19a includes the damping chamber 80 communicated with the ball valve 38 and in turn the respective exhaust ports 74. These ports can be cast, machined or otherwise formed in the valve housing 19a. The control ports 83, exhaust ports 81, and exhaust ports 74 are spaced circumferentially about the nozzle section 19a. Typically, two control ports 83, four exhaust ports 81, and four exhaust ports 74 are provided on the valve housing 19a. A tubular fluid filter screen assembly FSA is held on the nozzle housing 19a by retainer 75 and sealed thereto by O-ring 77. The assembly includes filter screens F overlying the inlet and control ports 72, 83 as shown to permit fluid flow through overlying openings OP in the filter support ring R and prevent entry of harmful dirt and debris particles that may be present in the fluid. The filter screens F are carried on the support ring R.

The inlet port 72 communicates with an annular chamber 73 that, in turn, is in communication with a radial fluid passage 67a of the spool 67. Passage 67a communicates with a longitudinal central passage 67b of the spool 67 having an orifice plug 67h press fit therein.

The slidable spool valve 67 is disposed in the valve housing 19a to provide a two stage operation wherein, in the first stage, pressurized fluid is supplied to the inlet or supply port 72 with the inner end 67c of the spool valve abutted against housing stop end wall (proximate insert 21) as shown in FIG. 1 as biased by spring 68 and with the ball valve 38 seated against the valve seat 21a with no electrical current to the coil 16. Spring 68 abuts an end closure 69. As a result, the entering fluid flow is caused to bypass the control ports 83 and instead is directed to flow through spool passages 67a, 67b and orifice plug 67h to the axial fluid passage of valve insert 21. The ball valve 38 initially is seated on the valve seat 21a by virtue of the force of the coil spring 42. The position of the spool valve 67 corresponding to a minimum fluid flow spool valve position relative to the control ports 80 occurs when the annular spool control land 67e is not communicated to the inlet port 72. However, once the fluid reaches valve seat 21, fluid pressure increases to a level that moves the spool valve 67 to the right in FIG. 1 against spring 68 sufficiently to communicate the annular control land 67e, to the inlet port 72 with exhaust ports 81 closed. This position of the spool valve 67 corresponds to a maximum fluid flow spool valve position relative to the control ports 83 wherein the annular spool control chamber is communicated to the inlet port 72. Communication of the spool control land 67e with the inlet port 72 also communicates the end 67d of the spool valve 67 to the control pressure port 83 via the passage 67g. Thus, when the steady state flow conditions are realized, the opposite ends of the spool valve 67 are subjected to equal fluid pressure.

Thereafter, a second stage of operation involves controlling the fluid flow through the control ports 83 by spool valve movement between the aforementioned minimum and maximum flow spool positions. Movement of the spool valve is controlled by diverting fluid from the valve seat 21a out through the exhaust ports 74 to vary fluid pressure in a linear proportional manner. For example, electrical current is supplied to the coil 16 via the contacts 54 to create an electromagnetic field which, in addition to the force of fluid pressure on the ball valve 38, overcomes the coil spring 42 and slight force of spring plate 24 to move the armature 22 in a linear proportional manner to the current level applied to coil 16. Since the ball valve 38 moves with the armature 22, the ball valve 38 will open in linear proportional manner to the current applied to the coil 16 and divert fluid out of the exhaust ports 74 to unbalance fluid pressure on the spool valve member ends to control the spool valve position in linear proportional manner between the aforementiond minimum and maximum fluid flow spool positions relative to the control ports 83 and exhaust ports 81 of the valve housing 19a. This provides a controlled fluid flow out of the control ports 83 in direct proportion to the opening of the ball valve 38 in accordance with linear movement of the armature 22 which, in turn, is directly proportional to the amount of electrical current supplied to the coil 16 of the solenoid 14.

Such axial spool movement as described herebove provides a negative gain mode of fluid flow control wherein there is a linear decrease in fluid pressure at the control ports 83 in proportion to an increase in electrical current to the coil 16. However, a positive gain mode of fluid flow control also can be achieved by the proportional variable force fluid control valve 10 described by reversing the flow of electrical current in the coil 16 and by introducing supply pressure through the inlet port 72 with the ball valve 38 in the full open position as determined by the position of the armature 22 with current flowing in the coil 16 as described in aforementioned U.S. Pat. No. 5,611,370.

Regardless of whether the proportional variable force solenoid control valve 10 is operated in a positive or negative gain mode, the armature disk 25 and damping chamber 80 will cooperate to reduce or dampen fluid pressure oscillations resulting from electrical, mechanical, and/or hydraulic noise in the controlled fluid system or circuit, which pressure oscillations, in turn, can result in non-linear valve response behavior. In an electronically controlled automobile transmssion application, electromechanical noise in the controlled system or circuit can originate in the transmission control module (e.g. a chopped pulse width control signal) and oscillations of the clutch or shift valves in the transmission body and produce fluid pressure oscillations and a non-linear valve response.

Figure 2:
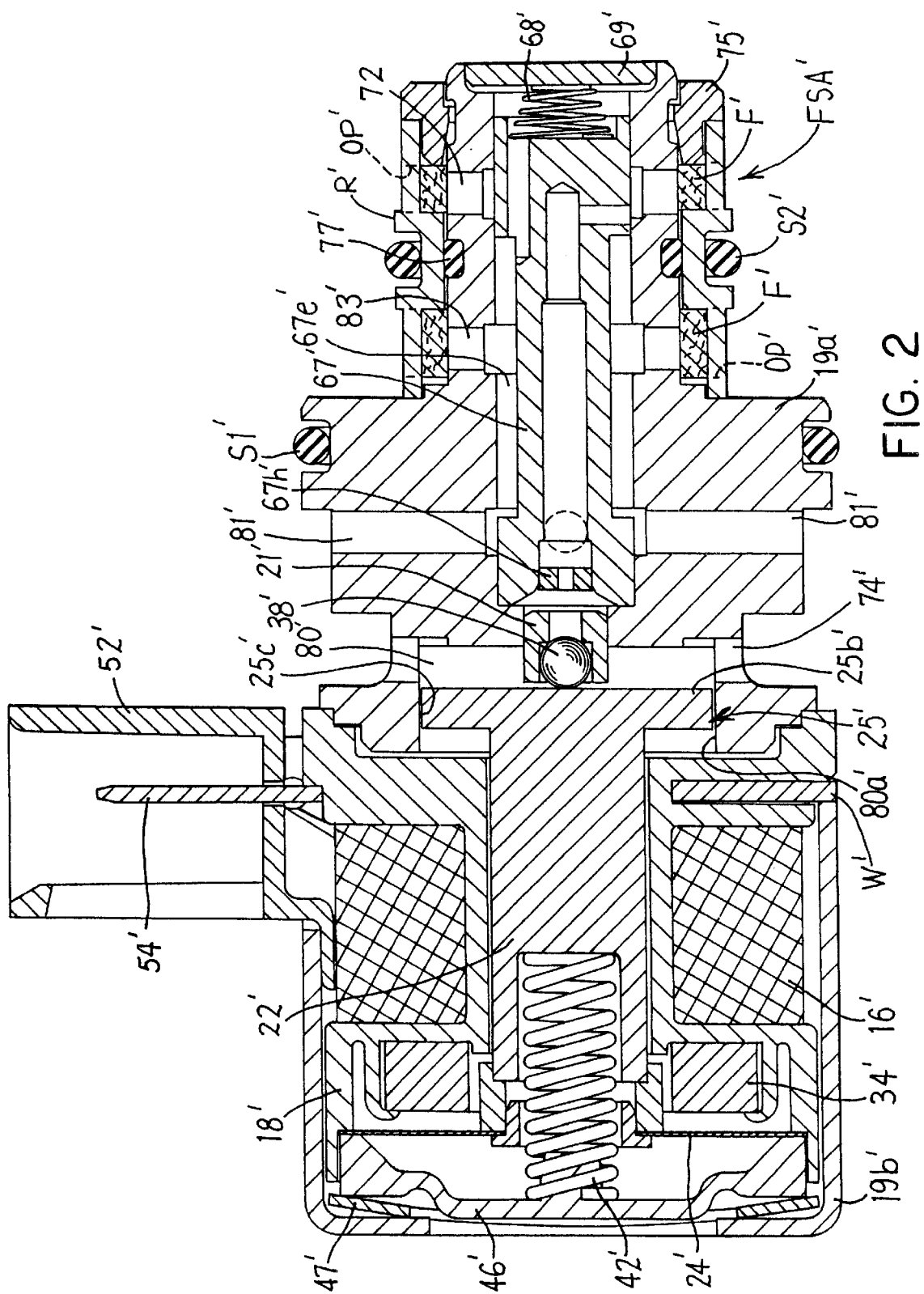

Referring to FIG. 2, another embodiment of the invention is illustrated wherein like reference numerals primed are used to desginate like features of FIG. 1. The embodiment of FIG. 2 differs from that of FIG. 1 in that the disk-section 25b' of the damping member 25' is not cup-shaped, but rather is provided with a flat disk configuration shown with a cylindrical outer surface 25c' cooperating with cylindrical wall 80a' of chamber 80' as described above. Plate spring 26 of FIG. 1 is not present in FIG. 2. The armature damping member 25' is received in chamber 80' in the manner described hereabove for FIG. 1 to cooperate with the chamber 80' to reduce or dampen fluid pressure oscillations resulting from noise in the controlled fluid system or circuit.

Figure 3:
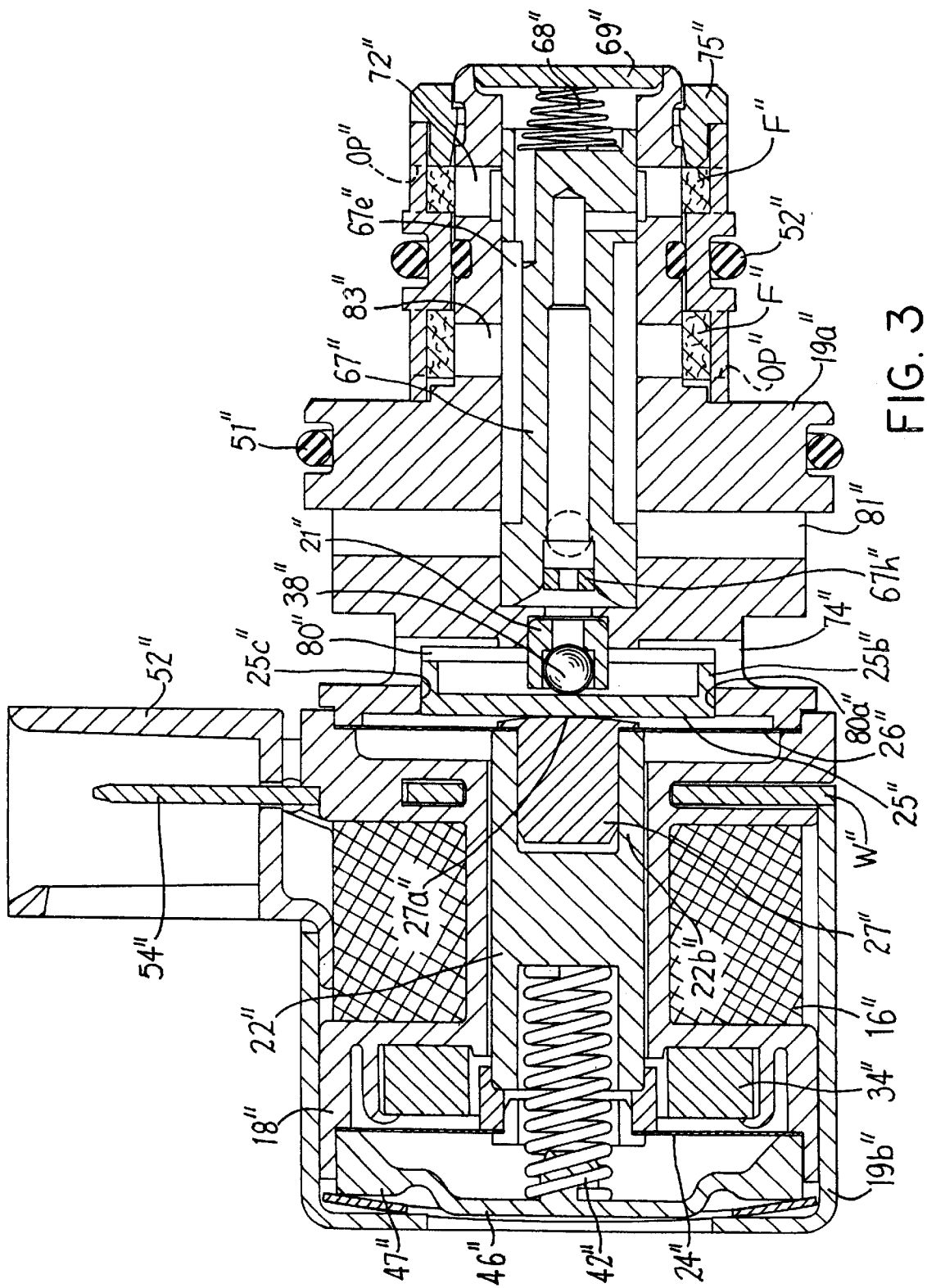

Referring to FIG. 3, still another embodiment of the invention is illustrated wherein like reference numerals double primed are used to desginate like features of FIG. 1. The embodiment of FIG. 3 differs from that of FIG. 1 in that the damping member 25" is separate from the armature 22" and is not connected thereto. Rather, the separate cup-shaped damping member or disk 25" residing in cylindrical damping chamber 80" is engaged by a cylindrical plug 27" fixedly press fit in the inner end 22b" of the armature as illustrated. The plug 27" includes a rounded nose 27a" to provide an approximate point contact with the damping member or disk 25" to this end. The armature damping member or disk 25" is received in chamber 80' in the manner described hereabove for FIG. 1 so that its cylindrical outer surface 25c" cooperates with the cylindrical chamber 80' to reduce or dampen fluid pressure oscillations resulting from noise in the controlled fluid system or circuit.

The embodiments of FIGS. 2 and 3 operate in a manner similar to the the embodiment of FIG. 1 to control fluid pressure and improve valve response stability to pressure oscillations in the controlled fluid system by virtue of cooperation between the damping member 25', 25" and respective damping chamber 80', 80".

In the above described embodiments of the invention, the spool spring 68, 68', 68" may be omitted and fluid pressure used to bias the spool as described in aforementioned U.S. Patent U.S. Pat. No. 5,611,370, already incorporated herein by reference.

Although certain preferred embodiments of the proportional variable force solenoid valve and fluid control device for an electronic transmission of the invention have been shown and described in detail, it should be understood that variations or modifications may be made without departing from the spirit or scope of the present invention.

What is claimed is:

1. A proportional variable force solenoid valve for controlling the pressure of a fluid in a fluid control system, comprising a housing having therein a solenoid coil, an armature movable in response to electrical current applied to the solenoid coil, said armature having an intermediate portion disposed in the solenoid coil and an outer portion disposed proximate a permanent magnet, means for biasing the armature in a direction to establish a valve fluid pressure response to solenoid coil current, and a cylindrical damping member cooperating with an inner end of the armature so as to move therewith, said damping member being received in a cylindrical fluid damping chamber in the housing with a cross-sectional area of said damping member and a clearance between said damping member and a cooperating wall of said damping chamber selected effective to reduce non-linear valve responses resulting from pressure oscillations in the fluid control system.

2. The valve of claim 1 wherein the damping member is connected to said inner end of said armature.

3. The valve of claim 2 wherein the damping member is integrally formed on said inner end of said armature.

4. The valve of claim 1 wherein the damping member is separate from and engaged by said inner end of said armature.

5. The valve of claim 1 having a damping area between a cylindrical periphery of said damping member and said wall of the cylindrical damping chamber in the range of 0.0003 to 0.0004 inch$^2$.

6. The valve of claim 1 wherein said damping member engages a fluid exhaust valve.

7. The valve of claim 6 wherein said fluid exhaust valve comprises a ball valve.

* * * * *